United States Patent [19]
Maurice et al.

[11] Patent Number: 5,915,507
[45] Date of Patent: Jun. 29, 1999

[54] POWER-OFF BRAKE WITH MANUAL RELEASE

[75] Inventors: Kevin L. Maurice, Bristol; Paul K. Seeto, Plainville; Jon L. Masthay, Plantsville, all of Conn.

[73] Assignee: Reliance Electric Industrial Company, Cleveland, Ohio

[21] Appl. No.: 08/932,904

[22] Filed: Sep. 17, 1997

[51] Int. Cl.$^6$ .................................................. B60T 13/04
[52] U.S. Cl. ...................... 188/171; 188/72.9; 192/89.21
[58] Field of Search ................................... 188/156, 171, 188/173, 72.2, 72.9, 72.7; 192/89.21, 83, 90

[56] References Cited

U.S. PATENT DOCUMENTS

| | | | |
|---|---|---|---|
| 3,724,620 | 4/1973 | Benson | 193/89.21 |
| 4,476,965 | 10/1984 | Brown | 188/72.3 |
| 5,549,186 | 8/1996 | Pardee | 192/89.21 |

FOREIGN PATENT DOCUMENTS

| | | | |
|---|---|---|---|
| 571346 | 1/1962 | Belgium | 188/72.2 |
| 0033955 | 3/1980 | Japan | 188/72.7 |

*Primary Examiner*—Robert J. Oberleitner
*Assistant Examiner*—H. S. Sawhrey
*Attorney, Agent, or Firm*—Timothy E. Newholm; John M. Miller; John J. Horn

[57] ABSTRACT

A power-off electromechanical brake employs a friction disk compressed between a ferromagnetic clapper plate and a pressure plate. An electromagnet may pull the clapper plate away from the friction disk or the pressure plate and clapper plate may be separated by free floating spacer elements held within a rotating race positioned between the clapper plate and the pressure plate. In a first mode, cavities in the clapper plate receive spacer elements held within the race and the friction disk is compressed. In a manual release mode, the spacer elements no longer engage with the cavities and separate the pressure plate and clapper plate.

5 Claims, 1 Drawing Sheet

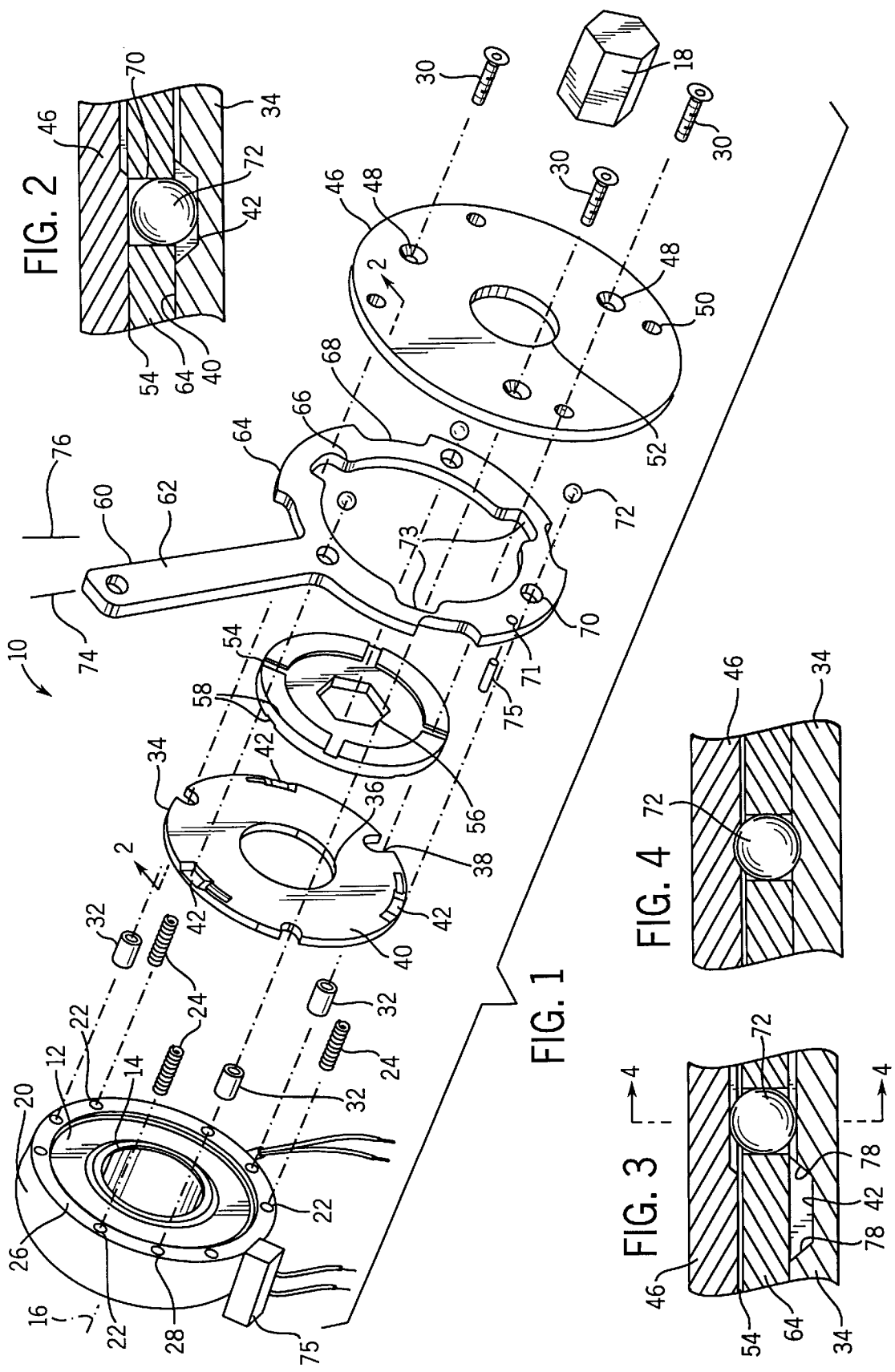

POWER-OFF BRAKE WITH MANUAL RELEASE

STATEMENT REGARDING FEDERALLY SPONSORED RESEARCH OR DEVELOPMENT

BACKGROUND OF THE INVENTION

Power-off electromechanical brakes are known in which electrical current to the brake serves to release the brake, which is otherwise activated. Such power-off brakes may be used when it is desirable that the brake be applied in the event of power failure, for example.

In one design of a power-off brake, a friction disk is coupled to the shaft to be braked while allowing some axial movement of the friction disk. The friction disk is normally compressed between a pressure plate and an axially-movable clapper by springs to provide a braking action. An electromagnet may be energized to retract the clapper plate against the force of the springs and allow the friction disk free rotation.

There may be situations where it is necessary to move the shaft of such a power-off brake when power has been lost. In this case, a manual release lever may be provided. The release lever may have a portion fitting around the periphery of the friction disk between the clapper and pressure plate. Rotation of the release lever may engage ramps on the lever and the pressure plate causing the lever to lift the clapper away from the friction disk.

A power-off brake incorporating such a release lever is manufactured by the Inertia Dynamics Division of Rockwell Automation of Connecticut under the tradename "FSBR (Mechanical Release)."

The release lever moves the clapper by a small amount limited by the air gap between the clapper and the electromagnet which is small to maximize the force between the clapper and the electromagnet. Nevertheless, the release lever ideally should move the clapper completely from any contact with the friction disk. This requires that the release lever be manufactured to close tolerances making it costly to produce. The close tolerances of the release lever also make it sensitive to wear, in particular between the ramps on the release lever and the pressure plate such as may prevent the release lever from fully releasing the clapper fully from the friction disk.

BRIEF SUMMARY OF THE INVENTION

The present invention provides a manual-release, power-off, electric brake in which the release lever does not interact directly with the clapper. Instead, the release lever shepherds separate spacer elements between the clapper and the pressure plate, the spacer elements which contact an offset surface on the clapper or pressure plate to separate the two. Tolerances in the release lever may be much relaxed and the spacers and their interaction with the offset surfaces may be designed to reduce friction and wear.

Specifically, the present invention provides a power-off brake for a rotating machine element. The brake includes a friction disk attachable to the machine element to rotate about an axis having a first and second opposed friction surface substantially perpendicular to the axis. A pressure plate is adjacent to the first friction surface of the friction disk and a ferromagnetic clapper is adjacent to the second friction surface of the friction disk. An offset surface is positioned on a surface of at least one of the pressure plate and ferromagnetic clapper facing the friction disk and a spring biases the ferromagnetic clapper and pressure plate together about the friction disk. An electromagnet is positioned adjacent to the ferromagnetic clapper to pull the ferromagnetic clapper away from the friction disk when current is passed through the electromagnet.

A race positioned coaxially about the friction disk and rotatable about the axis has a plurality of circumferentially disposed bores holding spacers fitting freely within the bores and extending therefrom between the pressure plate and the ferromagnetic clapper to engage the offset surface, with rotation of the race, to separate the pressure plate and the ferromagnetic clapper from the friction disk.

Thus, it is one object of the invention to allow a relaxed dimensional tolerance in the release lever. The release lever becomes simply a race to hold dimensionally accurate spacers which may move freely within bores of the release lever.

It is another object of the invention to allow optimization of the spacers independent of the material and fabrication of the release lever. By use of free floating spacers fitting within bores of the release lever, either hardened dimensionally accurate or self-lubricating spacer elements may be used.

The offset surfaces may be depressions formed in the surface of the clapper.

Thus another object of the invention is to simplify the construction of the release lever by eliminating the need for offset surfaces on the release lever and requiring only inset offset surfaces on the clapper.

The spacers may be steel ball bearings.

Thus it is another object of the invention to make use of readily available low-friction, hardened and dimensionally accurate ball bearings for the spacers.

The offset surfaces may be curved to conform with the surface of the ball bearings.

It is therefore yet another object of the invention to provide a release mechanism for separating the clapper and pressure plate and having reduced wear. Curvature of the offset surfaces spreads the force of the bearings out over a larger area, decreasing wear and lowering the dimensional tolerances needed of the offset surfaces as well as their sensitivity to localized wear.

The foregoing and other objects and advantages of the invention will appear from the following description. In this description, reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEWS OF THE DRAWINGS

FIG. 1 is an exploded perspective view of the brake of the present invention showing ball bearing spacers fitting within the race of the release lever;

FIG. 2 is a fragmentary detail cross-section taken along line 2—2 of the assembled brake of FIG. 1 showing the position of the spacers with respect to their surrounding components in a braking mode;

FIG. 3 is a figure similar to that of FIG. 2 showing the brake in the manual release mode; and FIG. 4 is a cross-section taken along line 4—4 of FIG. 3 showing an embodiment where the ball is held within a conforming trough for reduced wear and susceptibility to dimensional variations.

DETAILED DESCRIPTION OF THE INVENTION

Referring now to FIG. 1, a power-off brake 10 includes an electromagnet coil 12 having a generally cylindrical form with a central aperture 14 arranged along an axis 16 to receive a hexagonal drive shaft 18 that may rotate freely within the central aperture 14.

A coaxial, cylindrical collar 20 surrounds the electromagnet coil 12 and includes three circumferentially spaced axial bores 22 sized to receive compression springs 24. The compression springs 24 rest within the bores 22 and extending outward in an axial direction from a front face 26 of the collar 20. Threaded axial holes 28 are interspersed among the bores 22 in the collar 20 and receive machine screws 30 which, as will be described, are used to assemble various other components against the collar 20.

Tubular standoffs 32 fit over the shafts of the machine screws 30 when they are installed in holes 28 to provide for alignment of a disk-shaped clapper plate 34 adjacent to front face 26. Specifically, peripheral notches 38 in the clapper plate 34 fit about tubular standoffs 32 when they are held against the collar 20 by screws 30. The spacers prevent rotation of the clapper plate 34, but to allow axial movement thereof.

The clapper plate 34 has a central aperture 36 comparable to central aperture 14 and rests on its rearward face against the outward extending ends of springs 24. When the power-off brake 10 is assembled, the clapper plate is positioned so that springs 24 are compressed and so that the clapper plate 34 is naturally biased outward from the electromagnet coil 12. The clapper plate 34 is ferromagnetic so as to be attracted by the magnetic field generated by the electromagnet coil 12. When the electromagnet coil 12 is energized, the clapper plate 34 is drawn axially toward the electromagnet coil 12 further compressing the springs 24.

A front surface 40 of the clapper plate 34 includes at its outer edge three concave offset cavities 42 extending circumferentially and preferably stamped into the clapper plate at equal angles about its center.

A disk-shaped pressure plate 46 is positioned to the front side of the clapper plate 34 coaxially about axis 16 with a central aperture also allowing free passage of shaft 18. A front surface of the pressure plate 46 includes countersunk bores 48 receiving the heads of the machine screws 30 which may be tightened to draw the pressure plate 46 against the tubular standoffs 32 which have a fixed spaced-apart relationship with the front face 26 of the collar 20. The pressure plate 46 so positioned sandwiches the clapper plate 34 between a rear surface of the pressure plate 46 and the front face 26 of the coil collar 20.

The pressure plate 46 may also include mounting holes 50 for attaching the brake 10 to various pieces of equipment.

Captured between the clapper plate 34 and the pressure plate 46 and compressed by the action of springs 24 on the clapper plate 34, when electromagnet coil 12 is not activated, is a disk-shaped friction disk 54 having a hexagonal-keyed aperture 56 for engaging the shaft 18 to rotate therewith while allowing axial motion. The friction disk 54 is of somewhat smaller diameter than the clapper plate 34 so that its perimeter fits within the innermost edges of the offset cavities 42 and the tubular standoffs 32.

Friction surfaces 58 of conventional brake lining material line a front and rear surface of the friction disk 54 to contact a front face 40 of the clapper plate 34 at a friction surface 58 at the rear face of the friction disk 54 and to contact a rear surface of the pressure plate 46 with a friction surface 58 at the front surface of the friction disk 54.

When electromagnet coil 12 is not energized, the friction disk 54 is compressed between the clapper plate 34 and the pressure plate 46 to provide a braking action for the shaft 18.

A release lever 60 has a radially-extending handle 62 attached to an annular disk-shaped race 64 having a central aperture 66 coaxial with axis 16 and sized to surround without interference with the outer periphery of the friction disk 54. The race 64 may thus fit between the clapper plate 34 and the pressure plate 46.

Peripheral notches 73 extending outward from the aperture 66 of the race 64 fit around the tubular standoffs 32 and allow for limited rotation of the race 64 about axis 16 with movement of handle 62. Outer notches 68 extending inward from the outer periphery of the race 64 allow access to fasteners used with holes 50 in pressure plate 46.

The race 64 has three circumferentially separated bores 70 receiving bearing balls 72 therein. The bores 70 are sized so as to allow free axial movement of the balls 72, but to restrict their radial or circumferential movement. The thickness of the race 64 is such that the balls 72 extend on one or both sides of the race 64 to contact, on a front side, the rear face of pressure plate 46 and at certain angles to contact on their rear side, the front face of clapper plate 34.

Referring now to FIGS. 1 and 2, when the handle 62 is in a first position 74 (i.e., the brake 10 is in the braking mode with the electromagnet coil 12 off), the balls 72 align with the offset cavities 42 of the clapper plate 34, and by dropping into the offset cavities 42 allow the clapper plate 34 and pressure plate 46 to compress about the friction disk 54. This compression provides a braking action to shaft 18.

Generally the friction disk 54 will be slightly thicker than the race 64, but thinner than the diameter of the ball 72. Thus, when the balls 72 are received within the offset cavities 42, the race 64 does not interfere with compression of the friction disk 54 between the clapper plate 34 and pressure plate 46.

Referring to FIGS. 1 and 3, when the handle 62 of the release lever 60 is moved to a position 76 (i.e., the brake 10 is in the manual release mode with the electromagnet off), the ball 72 rides up out of the offset cavity 42 to contact the front surface 40 of the clapper plate 34 causing a separation of the clapper plate 34 and pressure plate 46. This separation is sufficient to prevent the clapper plate 34 and pressure plate 46 from compressing the friction disk 54 therebetween, and thus releases the shaft 18 for free rotation.

The friction disk 54 may also be released for free rotation when the handle 62 of the release lever 60 is in position 74 by a retracting of the clapper plate 34 toward the electromagnet coil 12 by activation of the electromagnet coil 12.

Referring now to FIGS. 3 and 4, the offset cavity 42 may be contoured so as to provide a broad contact area to the ball 72. Thus upward portions 78 of the offset cavity 42 may be curved to conform to the curvature of the ball 72 at their junction with the floor of the offset cavity 42 and the offset cavity 42 (viewed perpendicularly to the motion of the ball 72 as handle 62 is rotated) may be curved to conform with the contacting surfaces of the ball 72. A similar channel may be formed in the pressure plate 46. This curvature reduces the pressure on the ball 72, decreasing its wear, and by providing a broader area of contact, reduces the effect of minor perturbations or irregularities in the surfaces of the plates 46 and 34.

It will be understood from this description that the invention allows the dimensions of the race 64 to be substantially less critical in control of the separation between the clapper plate 34 and pressure plate 46 and the critical dimensions are those of the spacers (e.g., ball 72) and the offset cavities 42.

An additional bore 71 in the race 64 may hold a rearward extending pin 75 which may activate a switch 75 positioned on the outside of the collar 20 to indicate which of positions 74 and 76 the handle 62 is in and thus to prevent, for example, activation of shaft 18 by motors or the like when the electromagnet coil 12 is not activated and the handle 62 is in the brake position 74.

The above description has been that of a preferred embodiment of the present invention. It will occur to those that practice the art that many modifications may be made without departing from the spirit and scope of the invention. For example, the ball 72 need not be a ball, but may be any free floating spacer that may define the separation between the plates 46 and 34, as has been described. Nor need the ball be a steel material, but may include, for example, self-lubricating plastics or the like. If the ball 72 or an equivalent spacer is constructed of a resilient material, over-travel may be allowed in which the ball is compressed when the handle 62 is in the release position, ensuring that minor wear in the ball and surfaces does not prevent release of the friction disk 54. It will be further understood that the offset cavities 42 may be placed in the pressure plate 46 or in both the pressure plate 46 and clapper plate 34. In order to apprise the public of the various embodiments that may fall within the scope of the invention, the following claims are made.

I/We claim:

1. A power-off brake for a rotating machine element comprising:

a friction disk attachable to the rotating machine element to rotate about an axis, the friction disk having a first and second opposed friction surface substantially perpendicular to the axis;

a pressure plate adjacent the first friction surface of the friction disk;

a ferromagnetic clapper adjacent to the second friction surface of the friction disk;

an offset surface positioned on a surface of at least one of the pressure plate and ferromagnetic clapper facing the friction disk;

a spring biasing the ferromagnetic clapper and pressure plate together about the friction disk;

an electromagnet positioned adjacent to the ferromagnetic clapper to pull the ferromagnetic clapper away from the friction disk when current is passed through the electromagnet;

a race positioned coaxially about the friction disk and rotatable about the axis, the race having a plurality of circumferentially disposed bores; and spacers fitting freely within the bores to and extending therefrom between the pressure plate and ferromagnetic clapper, the spacers engaging the offset surface with rotation of the race to separate the pressure plate and ferromagnetic clapper from the friction disk.

2. The power-off brake of claim 1 wherein the offset surface is part of depressions formed in the surface of the clapper.

3. The power-off brake of claim 1 wherein the race includes a lever arm for manually rotating the race.

4. The power-off brake of claim 1 wherein the spacers are ball bearings.

5. The power-off brake of claim 4 wherein the offset surface is curved to conform to the surface of the ball bearings.

* * * * *